US010081526B2

(12) United States Patent
Dimond

(10) Patent No.: US 10,081,526 B2
(45) Date of Patent: *Sep. 25, 2018

(54) TREE STAND HOIST

(71) Applicant: Ronald W. Dimond, New Enterprise, PA (US)

(72) Inventor: Ronald W. Dimond, New Enterprise, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,386

(22) Filed: Feb. 20, 2018

(65) Prior Publication Data

US 2018/0179040 A1     Jun. 28, 2018

Related U.S. Application Data

(63) Continuation-in-part of application No. 15/416,187, filed on Jan. 26, 2017, now Pat. No. 9,902,601.

(60) Provisional application No. 62/288,464, filed on Jan. 29, 2016.

(51) Int. Cl.
| | |
|---|---|
| *B66D 3/00* | (2006.01) |
| *B66F 11/04* | (2006.01) |
| *B66D 3/02* | (2006.01) |
| *A01M 31/02* | (2006.01) |

(52) U.S. Cl.
CPC ............. *B66F 11/04* (2013.01); *B66D 3/02* (2013.01); *A01M 31/02* (2013.01)

(58) Field of Classification Search
CPC .... B66D 3/00; B66D 3/04; B66D 2700/0183; B66D 2700/023; A01M 31/02
See application file for complete search history.

(56) References Cited

U.S. PATENT DOCUMENTS

| | | | | |
|---|---|---|---|---|
| 4,399,973 A * | 8/1983 | Spry | ...................... | A47G 33/12 248/524 |
| 5,388,664 A * | 2/1995 | Bator | .................... | A01M 31/02 182/100 |
| 5,669,403 A * | 9/1997 | Belcher | ............... | A01M 31/025 135/120.4 |
| 5,820,455 A * | 10/1998 | Breedlove | ................ | A22B 5/06 452/187 |
| 8,011,476 B1 * | 9/2011 | Alcon | ....................... | E06C 7/16 182/116 |
| 8,381,876 B1 * | 2/2013 | Darden | .................. | A63B 27/02 182/136 |
| 9,902,601 B1 * | 2/2018 | Dimond | .................. | B66F 11/04 182/136 |
| 2003/0178255 A1 * | 9/2003 | Auer | ...................... | A01M 31/00 182/187 |
| 2008/0314683 A1 * | 12/2008 | Bedell | .................... | A01M 31/02 182/136 |
| 2011/0260127 A1 * | 10/2011 | Surgeon | .................. | B66D 3/20 254/362 |

(Continued)

*Primary Examiner* — Emmanuel M Marcelo
(74) *Attorney, Agent, or Firm* — Joseph E. Maenner; Maenner & Associates, LLC

(57) ABSTRACT

In described embodiments, the present invention is a collapsible tree stand hoist having a support structure having a ground end and a frame end. The support structure is formed from a plurality of assembled members. A generally "U-shaped" frame is attached to the frame end of the support structure. A plurality of teeth extends outwardly from the frame. The frame includes a flexible member releasably secured to at least one end of the frame. A pulley is attached to the flexible member.

19 Claims, 5 Drawing Sheets

(56) References Cited

U.S. PATENT DOCUMENTS

| | | | |
|---|---|---|---|
| 2011/0308887 A1* | 12/2011 | Johnson | A01M 31/02 182/187 |
| 2012/0181110 A1* | 7/2012 | Browning | A01M 31/02 182/113 |
| 2014/0026477 A1* | 1/2014 | Ferguson | A47G 33/12 47/40.5 |
| 2014/0182969 A1* | 7/2014 | Overbaugh | A01M 31/02 182/116 |
| 2014/0190767 A1* | 7/2014 | Wheelington | A01M 31/02 182/129 |
| 2015/0289498 A1* | 10/2015 | Boekeloo | A01M 31/02 182/187 |
| 2017/0245490 A1* | 8/2017 | Habberstad, Jr. | A01M 31/02 |

* cited by examiner

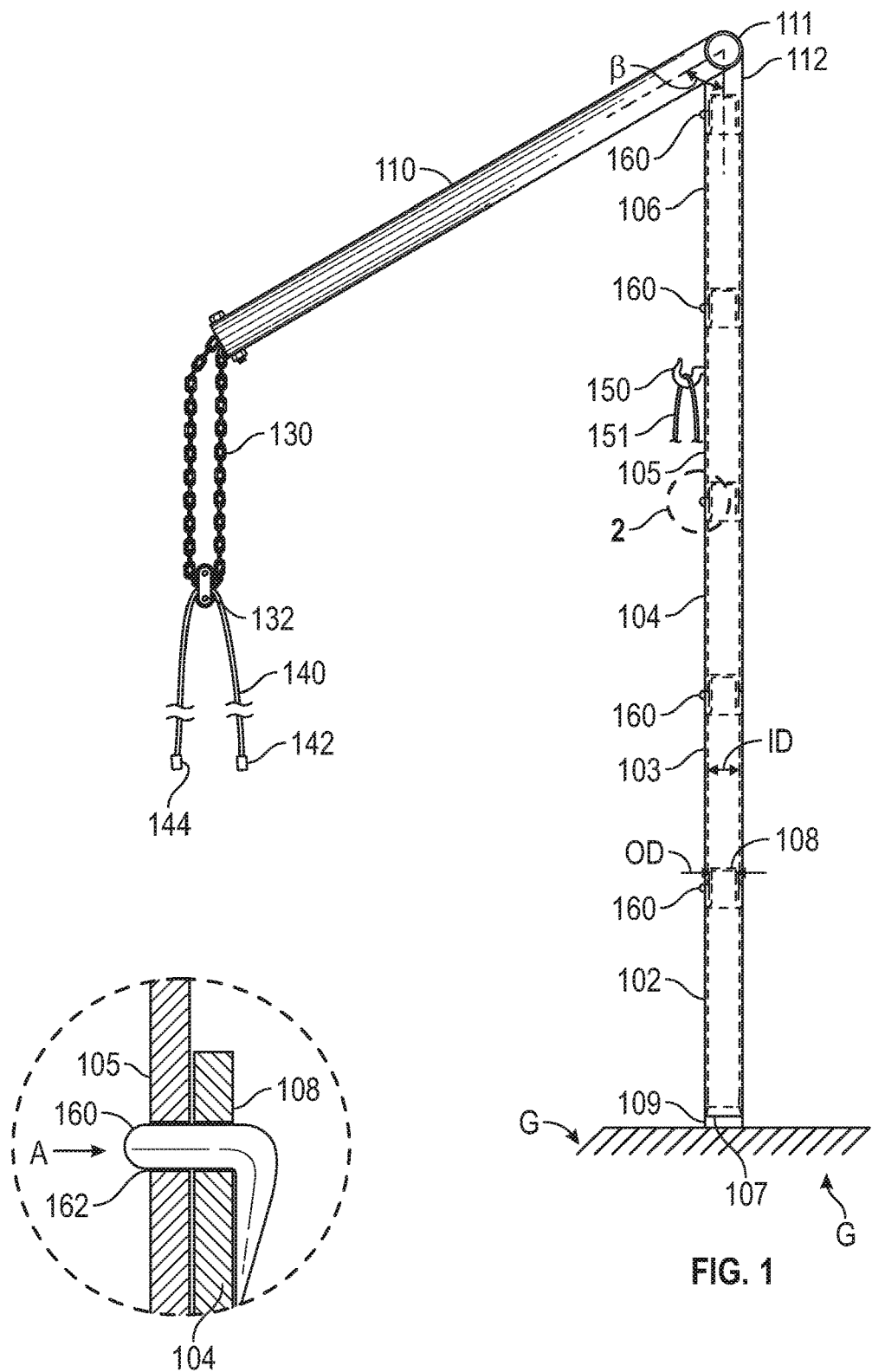

TREE STAND HOIST

CROSS-REFERENCE TO RELATED APPLICATION

The present application is a continuation-in-part of U.S. patent application Ser. No. 15/416,187, filed on Jan. 26, 2017, which claims priority from U.S. Provisional Patent Application Ser. No. 62/288,464, filed on Jan. 29, 2016, which are both incorporated by reference herein in their entireties.

BACKGROUND OF THE INVENTION

Field of the Invention

The present invention relates to hoists, and, in particular, to hoists that are temporarily erected against a tree and are used to hoist a tree stand.

Description of the Related Art

Tree stands are often used by hunters and nature watchers to provide an elevated position in a forested region, either to provide the user with a better field of view or to partially conceal the user from wildlife on the ground.

Hoists have been used to assist the user to lift tree stands into trees. Known prior art hoists are heavy and cumbersome, and may take more than one person to assemble and to hoist the stand into the tree. Oftentimes, users like to keep the locations of their tree stand as a secret from others so that the others will not encroach on their selected location. Hoists that require multiple people to assemble and use defeat such intentions.

It would be beneficial to provide a tree stand hoist that is portable and light enough to be carried and erected by a single person.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a collapsible tree stand hoist having a support structure having a ground end and a frame end. The support structure is formed from a plurality of assembled members. A generally "U-shaped" frame is hingedly attached to the frame end of the support structure. The frame includes a flexible member releasably secured to at least one end of the frame. A pulley is attached to the flexible member.

In another embodiment, the present invention is a tree stand hoist including a generally U-shaped frame assembly. The frame assembly has an apex and first and second opposing ends. A vertical support assembly is connected to the U-shaped frame at the apex. A flexible member has a first flexible member end connected to the first end of the frame assembly and a second flexible member end releasably connectable to the second end of the frame assembly. A pulley is coupled to the flexible member and extends between first flexible member end and the second flexible member end.

In yet another embodiment, the present invention is a collapsible tree stand hoist comprising a generally U-shaped frame assembly, a vertical support assembly connected to the U-shaped frame, and a flexible member having a first flexible member end connected to the first end of the frame assembly and a second flexible member end releasably connectable to the second end of the frame assembly. A pulley is coupled to the flexible member and extending between the first flexible member end and the second flexible member end.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 1 is a side elevational view of a tree stand hoist according to an exemplary embodiment of the present invention;

FIG. 2 is an enlarged view of a releasably locking assembly used with the tree stand hoist shown in FIG. 1;

DETAILED DESCRIPTION

Figure 3:
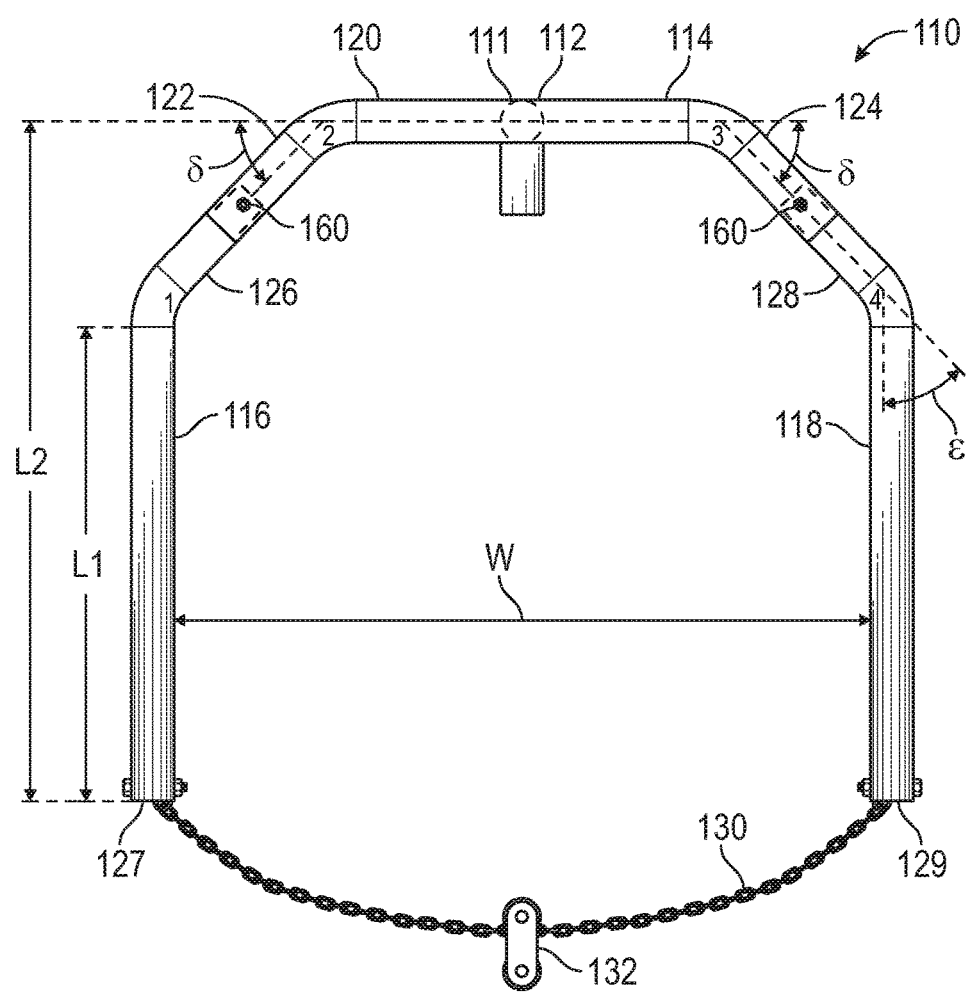
FIG. 3 is a top plan view of the tree stand hoist shown in FIG. 1.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Referring to the Figures, a tree stand hoist 100 according to an exemplary embodiment of the present invention is shown. Hoist 100 includes a plurality of support members 102, 103, 104, 105, 106 that can be connected to each other to extend to a height of about 16 feet. In an exemplary embodiment, each support member 102-106 has a length of about 4'-3", although those skilled in the art will recognize that each support member 102-106 can be a different length. Further, support members 102-106 can be different lengths from other support members 102-106. While five support members 102-106 are shown in FIG. 1, those skilled in the art will also recognize that a different number of support members can be used. By way of example only, FIG. 3B shows only four support members 102-105.

Each of members 102-106 is a tubular member having a bottom end 107 with an inner diameter "ID" and a top end 108 with an outer diameter "OD" that is smaller than inner diameter "OD" such that bottom end 107 of one member 103-106 can be inserted over top end 108 of another of member 102-105 to "stack" members 102-105 on top of each other, as shown in FIG. 1. In an exemplary embodiment, top end 108 can be about 6 inches long, so that the effective length of each member 102-106, when stacked on top of each other, is about 4 feet. When all five members 102-106 are stacked as shown in FIG. 1, hoist 100 has a length of about 16 feet.

Optionally, members 102-106 can include a releasable locking mechanism to releasably secure adjacent members 102-106 to each other. By way of example only, as shown in FIG. 2, a biased pin 160 can be located at top end 108 of each of members 102-106, and a through-opening 162 in side wall at bottom end 107 of each of member 102-106 can be sized to allow pin 160 to extend therethrough, thereby securing adjacent members 102-106 to each other. Pushing pin 160 inward in the direction of arrow "A" in FIG. 2 and into its respective member 102-106 allows a user to separate adjacent members 102-106 from each other to dismantle hoist 100 for transport and/or storage. Still optionally, a rubber foot 109 can be releasably inserted into bottom end 107 of lowest support member 102 to provide friction with the ground "G" and to help stabilize hoist 100 against ground G.

Top end 108 of support member 106 supports a generally U-shaped assembly 110 that extends outwardly from top support member 106 at an assembly connection 112 at an apex 111 of U-shaped assembly 110. When U-shaped assembly 110 is connected to top support member 106, U-shaped assembly 110 and top support member 106 form an angle β of between 30 degrees and about 60 degrees.

Referring to FIG. 3, U-shaped assembly 110 is constructed from a plurality of members 114, 116, 118. Member 114 is a central member that includes assembly connection 112 and has a support member 120 that extends generally orthogonally from connection 112. Each end 122, 124 of support member 120 bends at an angle δ relative to support member 120. In an exemplary embodiment, angle δ can be about 45 degrees, although those skilled in the art will recognize that angle δ can be other values as well.

Member 116 is a first arm member that has an end 126 that is releasably attachable to end 122 and member 118 is a second arm member that has an end 128 that is releasably attachable to end 124, as shown in FIG. 3. End 126 fits into end 122 and end 128 fits into end 128 in a manner similar to end 180 fitting into end 107 with respect to support members 102-106 as discussed above. Optionally, locking pins 160 may be provided on ends 126, 128 to releasably lock ends 126, 128 into ends 116, 118, respectively. Each of members 116, 118 has a length L1. In an exemplary embodiment, length L1 is about 10 inches, although those skilled in the art will recognize that L1 can be other lengths as well.

Ends 126, 128 are each bent at an angle ε with respect to their member 116, 118. In an exemplary embodiment, angle ε is about 45 degrees, although those skilled in the art will recognize that angle ε can be other values as well.

When angles δ and ε are each 45 degrees, member 116 extends generally parallel to member 118. Additionally, members 116, 118 are each orthogonal to member 120. When assembled as shown in FIG. 2, U-shaped assembly 110 has an interior width W of about 24 inches and a length L2 of about 28 inches in order for U-shaped member 110 to be able to fit around the perimeter of a tree trunk.

A securing line 130 has a first end that is fixedly secured to a free end 127 of member 116 and a second end that is releasably securable to a free end 129 of member 118 so that securing line 130 extends between arm members 116, 118 and can be wrapped around the trunk of the tree prior to lifting U-shaped member 110. Securing member 130 is a flexible member, such as a chain, a rope, a cable, or other suitable flexible member or material.

A pulley 132 is attached to securing line 130 so that a lifting line 140 can be inserted through pulley 132. Lifting line 140 is sufficiently long so that a first end 142 can be tied to a tree stand (not shown) with a rope 131 (shown in FIG. 3A) and a second end 144 can be grasped by a user and pulled in order to lift tree stand up and into the tree. Pulley 132 is slidingly attached to securing line 130 so that pulley 132 can slide along the length of securing line 130 as needed.

Figure 3A:
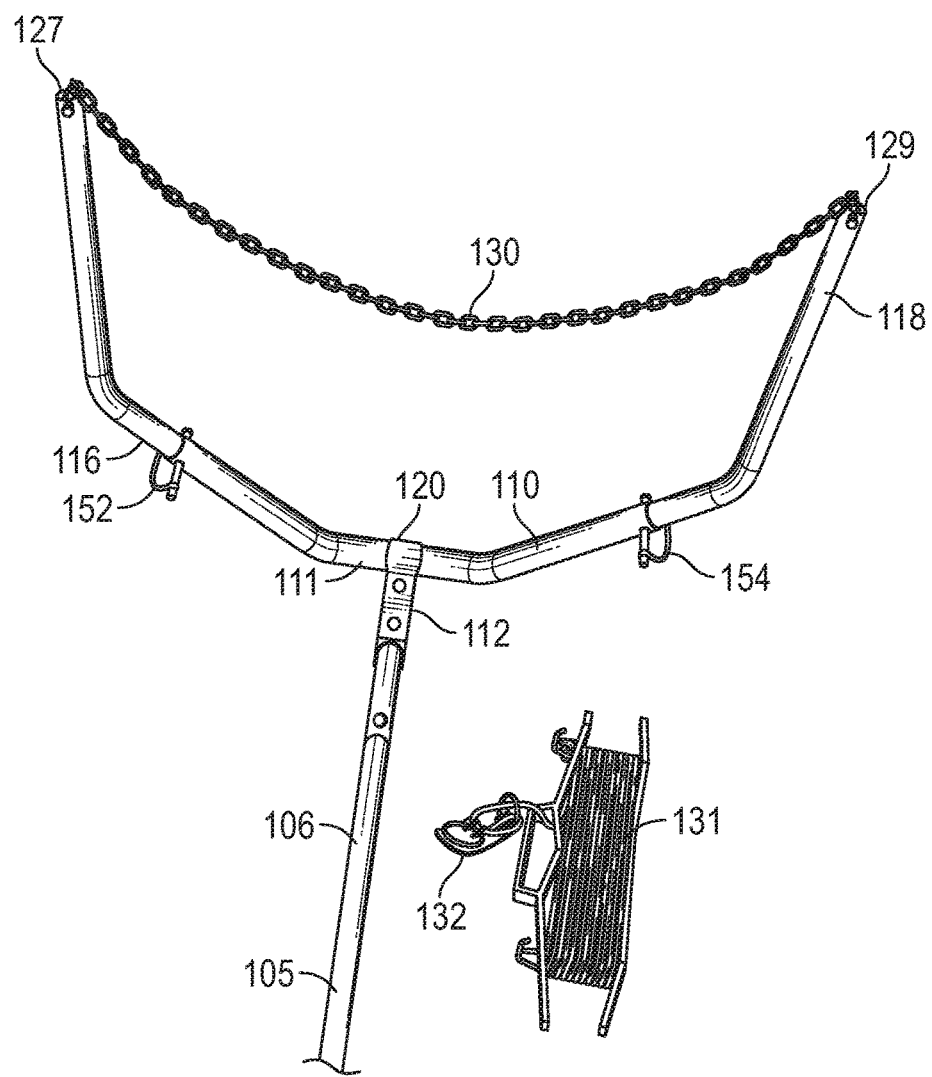
FIG. 3A is a bottom perspective view of the tree stand hoist shown in FIG. 1.
Figure 3B:
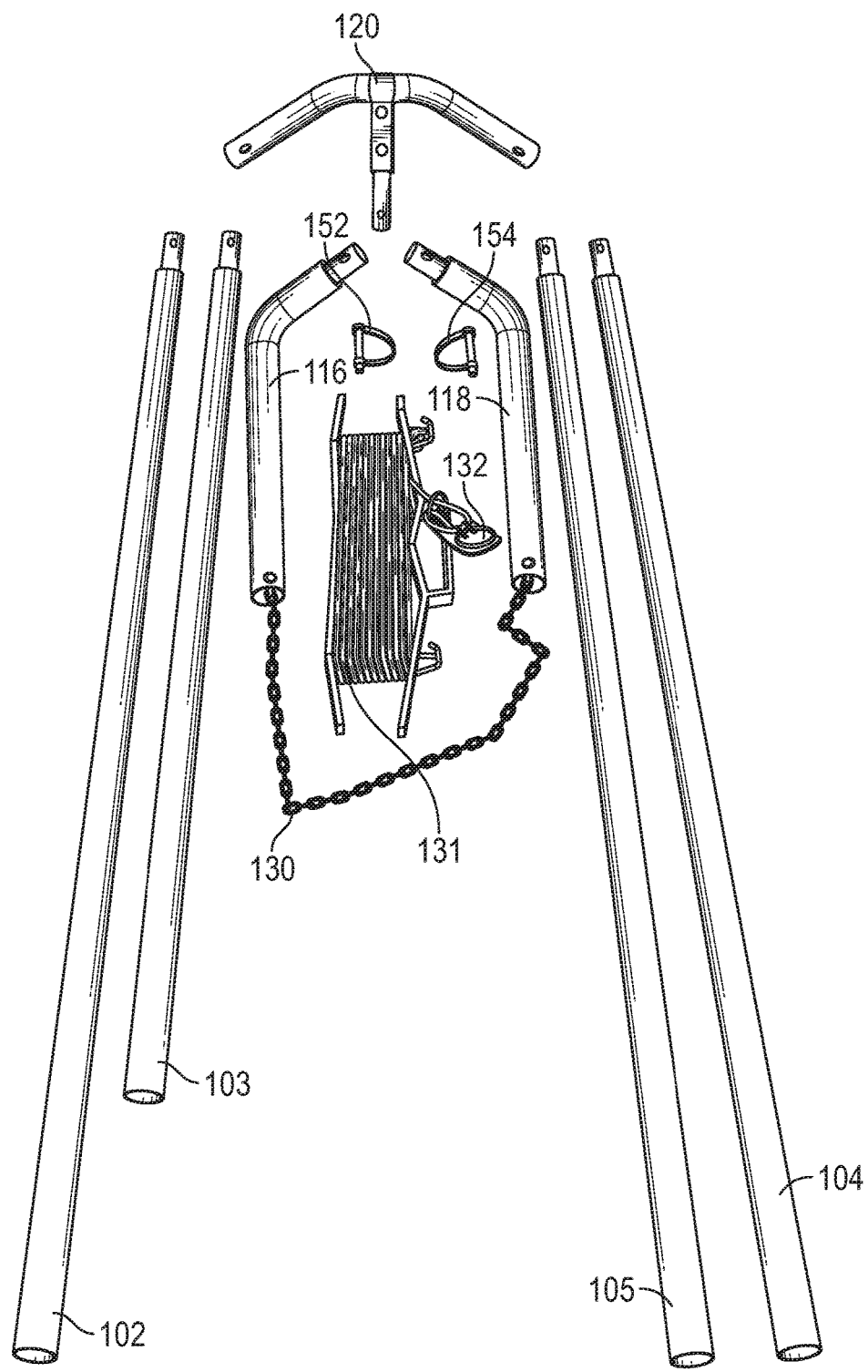
FIG. 3B is a perspective view of the tree stand hoist shown in FIG. 1 in a disassembled condition.

Optionally, as shown in FIG. 1, support member 105 includes a hook 150 that supports a tie line 151. Still optionally, as shown in FIGS. 3A and 3B, instead of hook 150, clips 152, 154 can be fit over members 116, 118, respectively and, after hoist 100 is set against a tree, tie line 151 can be strung between clips 152, 154 and around the tree to secure hoist 100 to the tree.

The separate members 102-106, 114-118 allow a user to carry hoist 100 in a bag (not shown) or other carrying device and remove the members 102-106, 114-118 from the bag for assembly at the tree in which the user desires to erect his/her tree stand.

To use hoist 100, the user selects a tree with no branches for about the first 20-25 feet from the ground. The user then assembles and slips U-shaped assembly 110 around the tree trunk so that the trunk is between member 116 and member 118. The user then ties securing line 130 to free end 129 of member 118.

Next, the user connects top support member 106 to assembly connection 112 and connects other members 105, 104, 103, 102, sequentially, and as need, underneath member 106. At this point, with all of support members 102-105 connected, the top of hoist 100 extends about 20 feet from the ground.

The user ties first end 142 of lifting line to the tree stand and pulls on second end 144 of lifting line 140, lifting tree stand up to the tree. When the stand is up, the user climbs up the tree stand, pausing at the optional hook 150, reaching around either side of the tree and grasping each end of tie line 151, pulling the ends around either side of the tree and tying the ends together, securing hoist 100 to the tree. The user then continues climbing up the tree stand.

Hoist 100 can be dissembled for ease of transport. FIG. 3B shows hoist 100 broken down into pieces, forming a kit for transport. The kit can be inserted into a bag (not shown) and assembled immediately prior to use. Similarly, after use, hoist 100 can be disassembled for transport.

Figure 4:
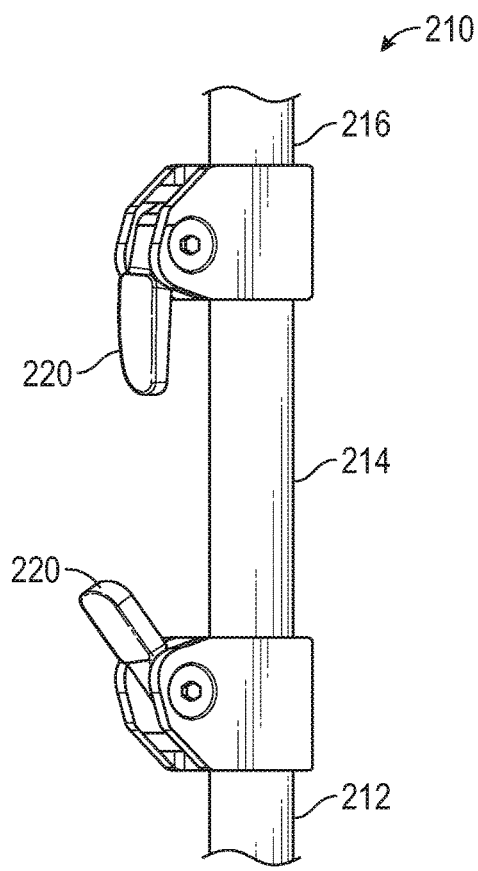
FIG. 4 is a side elevational view of an alternative embodiment of a support structure for use with the hoist shown in FIG. 1.

While support members 102-106 are shown in use with hoist 100, those skilled in the art will recognize that other types of supports can be used. By way of example only, a telescoping support assembly 210 can be used, as shown in FIG. 4. Support assembly 210 can use a plurality of legs telescopically fit within adjacent legs. While FIG. 4 shows only three legs 212, 214, 216, those skilled in the art will recognize that more legs can be used. Each of legs 212, 214, 216 is releasably secured to an adjacent support by a locking lever assembly 220. Locking lever assembly 220 is well known, such as is used to releasably secure the legs of a camera tripod.

While locking lever assembly 220 is shown, those skilled in the art will recognize that other types of securing mechanisms, such as, for example, wing nuts with compression fittings, as are commonly used to releasably secure the members of cymbal stands, can also be used.

Figure 5:
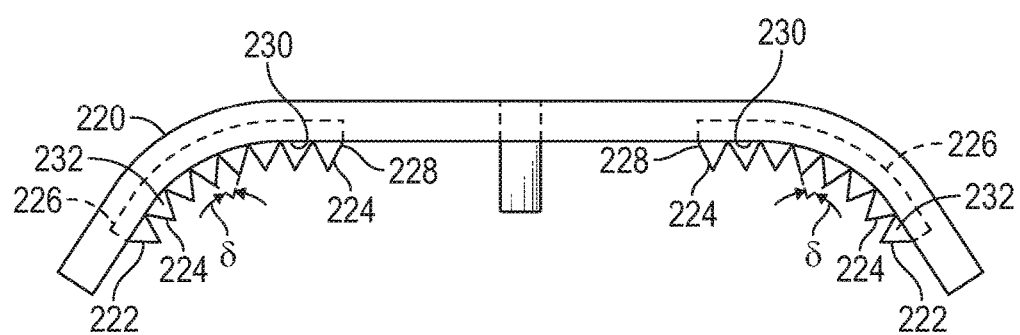
FIG. 5 is a top plan view of an alternative embodiment of a support member for use with a tree stand hoist according to the present invention.

Optionally, in an alternative embodiment, shown in FIG. 5, a support member 220 can include a plurality of tree bark grips 222 extending outwardly therefrom. Each grip 222 includes a plurality of generally planar, triangular teeth 224 that are attached to a bracket 226. Bracket 226 can be inserted into a slot 230 in support member 220 and fixed connected to support member 220, such as by welding.

A grip 222 can be located on either side of an assembly connection 212 and be directly inwardly such that, when assembly connection 212 is inserted into support member 106 (shown in FIG. 1) and leaned against a tree, at least one of the teeth 224 "bites" into the tree to maintain the position of the hoist against the tree.

As shown in FIG. 5, each grip 222 includes a first portion 228 of teeth 224 that extend generally in a first direction, and a second portion 232 of teeth 224 that extend in a second direction, angled at angle δ relative to the first direction.

It will be further understood that various changes in the details, materials, and arrangements of the parts which have been described and illustrated in order to explain the nature of this invention may be made by those skilled in the art without departing from the scope of the invention as expressed in the following claims.

I claim:
1. A tree stand hoist comprising:
   a generally U-shaped frame assembly, the frame assembly having a support member with an apex and first and second opposing ends;
   a plurality of triangular teeth extending outwardly from the support member, the plurality of triangular teeth configured to bite into a tree; and
   a vertical support assembly connected to the U-shaped frame at the apex.
2. The tree stand hoist according to claim 1, wherein the U-shaped frame assembly comprises a plurality of adjacent frame members, wherein each frame member is releasably connectable to an adjacent frame member.
3. The tree stand assembly according to claim 2, wherein the plurality of adjacent frame members comprises a first frame member having a central portion connected to the vertical support assembly, a first end portion extending at an angle relative to the central portion, and a second end portion extending at the angle relative to the central portion.
4. The tree stand assembly according to claim 3, wherein the plurality of adjacent frame members comprises a first arm releasably connected to the first end portion and a second arm releasably connected to the second end portion.
5. The tree stand hoist according to claim 1, wherein the vertical support assembly comprises a plurality of adjacent support members, wherein each support member is releasably connectable to an adjacent frame member.
6. The tree stand hoist according to claim 1, wherein the vertical support assembly is releasably connected to the U-shaped frame assembly.
7. The tree stand hoist according to claim 1, further comprising a flexible member having a first flexible member end connected to the first end of the frame assembly and a second flexible member end releasably connectable to the second end of the frame assembly.
8. The tree stand hoist according to claim 7, further comprising a pulley coupled to the flexible member and extending between the first flexible member end and the second flexible member end.
9. The tree stand assembly according to claim 8, wherein the pulley is slidingly coupled to the flexible member.
10. The tree stand assembly according to claim 7, wherein the first flexible member end is fixedly connected to the first end of the frame assembly.
11. A collapsible tree stand hoist comprising:
    a generally U-shaped frame assembly having a plurality of teeth extending outwardly from the frame assembly, wherein the plurality of teeth comprises a first portion extending in a first direction and a second portion extending in a second direction, angled at an angle relative to the first direction;
    a vertical support assembly connected to the U-shaped frame assembly;
    a flexible member having a first flexible member end connected to a first end of the frame assembly and a second flexible member end releasably connectable to a second end of the frame assembly; and a pulley coupled to the flexible member and extending between the first flexible member end and the second flexible member end.

12. The collapsible tree stand hoist according to claim 11, wherein the U-shaped frame assembly comprises at least three frame members, wherein two of the frame members are releasably connectable to a third member.

13. The collapsible tree stand hoist according to claim 12, wherein the third member has a central portion and opposing end portions, each of the opposing end portions extending at an angle relative to the central portion.

14. The collapsible tree stand hoist according to claim 12, wherein each of the two of the frame members comprises a connecting end connectable with one of the opposing end portions and a free end extending at an angle from the connecting end.

15. The collapsible tree stand hoist according to claim 11, wherein the flexible member is connected to the first end of the frame assembly.

16. The collapsible tree stand hoist according to claim 11, wherein the pulley is slidingly coupled to the flexible member.

17. The collapsible tree stand hoist according to claim 11, wherein the vertical support assembly comprises at least three support members, wherein two of the support members a releasably connectable to a third member, and wherein one of the two support members is connected to the U-shaped frame assembly.

18. The collapsible tree stand assembly according to claim 11, wherein the frame assembly is releasably connected to the vertical support assembly.

19. A collapsible tree stand hoist comprising:
a generally U-shaped frame assembly comprising a plurality of frame members releasably couplable together, at least one of the plurality of frame members including at least one triangular tooth extending outwardly therefrom, the at least one triangular tooth configured to bite into a tree;
a vertical support assembly connected to the U-shaped frame assembly the vertical support assembly comprising a plurality of vertical support members releasably couplable together;
a flexible member having a first flexible member end connected to the frame assembly and a second flexible member end releasably connectable to the frame assembly; and
a pulley coupled to the flexible member and extending between the first flexible member end and the second flexible member end.

* * * * *